United States Patent
Hu et al.

(10) Patent No.: US 11,693,217 B2
(45) Date of Patent: Jul. 4, 2023

(54) OPTICAL IMAGING LENS ASSEMBLY

(71) Applicant: ZHEJIANG SUNNY OPTICAL CO., LTD, Ningbo (CN)

(72) Inventors: Yabin Hu, Ningbo (CN); Fujian Dai, Ningbo (CN); Liefeng Zhao, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 323 days.

(21) Appl. No.: 17/034,523

(22) Filed: Sep. 28, 2020

(65) Prior Publication Data

US 2021/0141195 A1 May 13, 2021

(30) Foreign Application Priority Data

Nov. 8, 2019 (CN) .......................... 201911085520.6

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ............................. G02B 13/0045; G02B 9/60
USPC ................... 359/714, 753, 763, 764
See application file for complete search history.

(56) References Cited

U.S. PATENT DOCUMENTS

| 2011/0273611 | A1* | 11/2011 | Matsusaka | G02B 13/0045 359/716 |
| 2016/0011406 | A1* | 1/2016 | Koizumi | G02B 13/0045 359/714 |
| 2018/0364454 | A1 | 12/2018 | Yang | |
| 2019/0121097 | A1* | 4/2019 | Huang | G02B 13/0045 |
| 2021/0215909 | A1 | 7/2021 | Hu et al. | |

FOREIGN PATENT DOCUMENTS

| CN | 109459840 A | 3/2019 |
| CN | 110275278 A | 9/2019 |

OTHER PUBLICATIONS

Examination Report in corresponding Indian Application No. 202014041900, dated Sep. 16, 2021, 6 pgs.

* cited by examiner

*Primary Examiner* — William Choi
(74) *Attorney, Agent, or Firm* — Hauptman Ham, LLP

(57) ABSTRACT

The present disclosure discloses an optical imaging lens assembly including, sequentially from an object side to an image side along an optical axis, a first lens having positive refractive power; a second lens having refractive power; a third lens having positive refractive power with a concave object-side surface and a convex image-side surface; a fourth lens having positive refractive power with a concave object-side surface and a convex image-side surface; and a fifth lens having refractive power. Half of a maximal field-of-view Semi-FOV of the optical imaging lens assembly satisfies: Semi-FOV>48°.

18 Claims, 9 Drawing Sheets

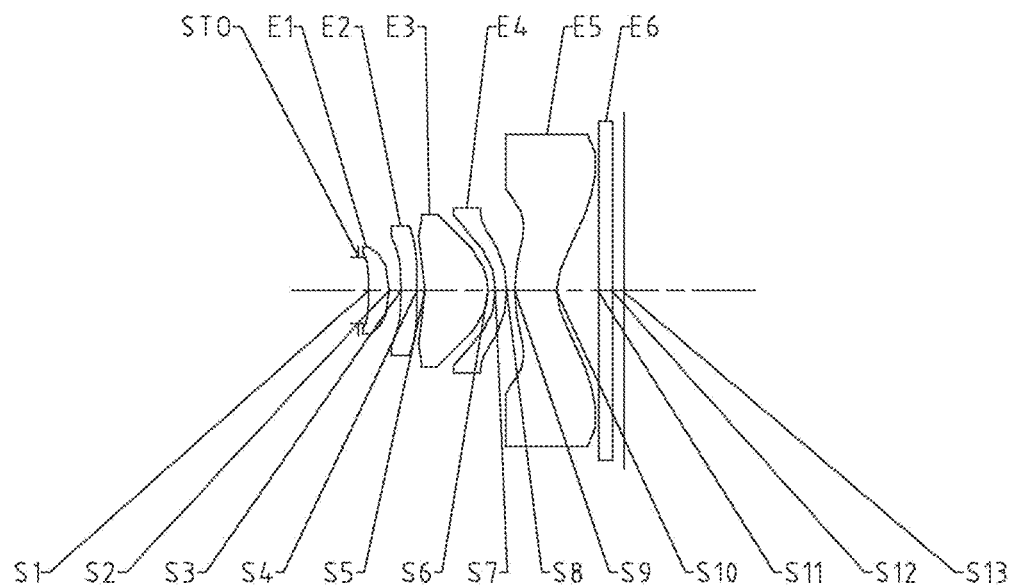
Fig. 5
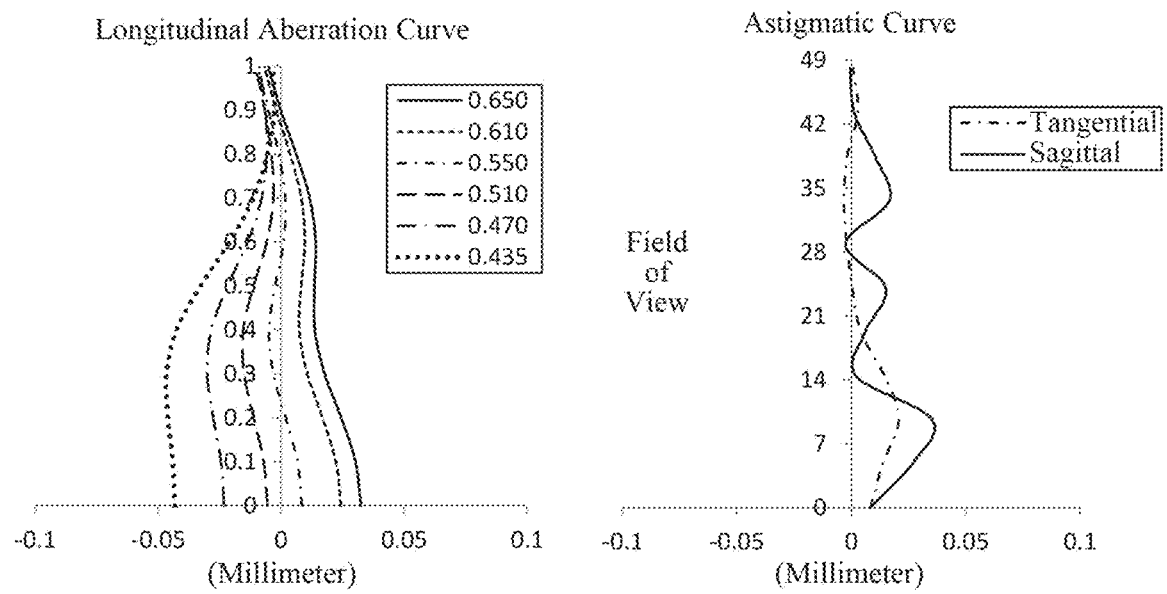
Fig. 6A
Fig. 6B

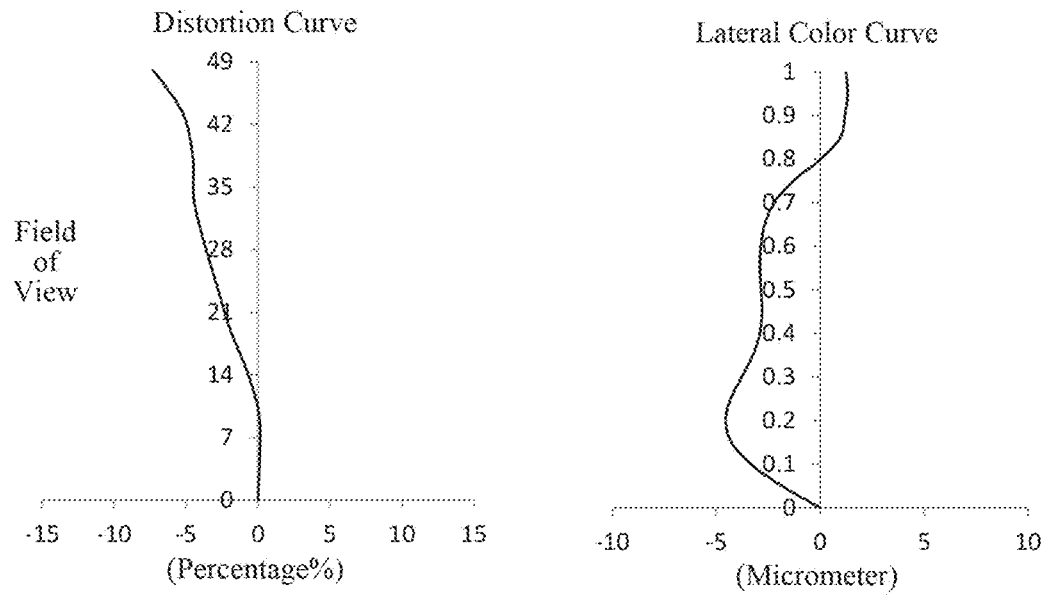
Fig. 6C
Fig. 6D
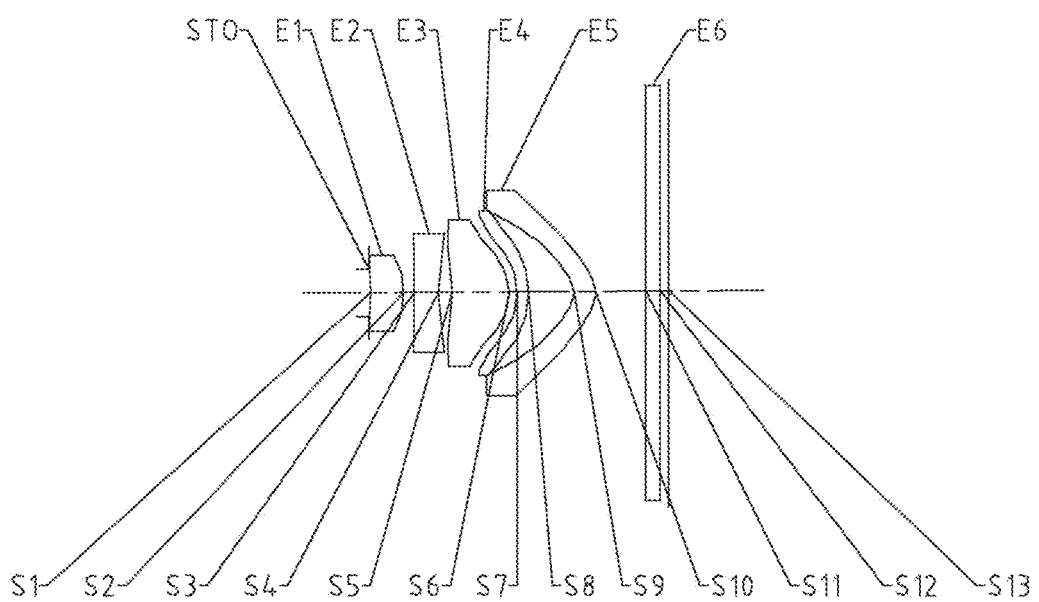
Fig. 7

OPTICAL IMAGING LENS ASSEMBLY

CROSS-REFERENCE TO RELATED APPLICATION

This application claims benefit of priority to Chinese Patent Application No. 201911085520.6 filed on Nov. 8, 2019 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

As the miniaturized electronic device, such as smart phone, has more and more enhanced camera functions gradually, it has been required for the hardware (such as CCD and CMOS image sensors) and the optical imaging lens assembly installed thereon to have a better performance. Especially, with the development of the 5th generation technology, mobile phone live broadcast is becoming more and more popular with the support of high-speed communication technology. In order to accommodate this trend, the mobile phone may be equipped with an ultra-wide-angle optical imaging lens assembly at the front end of the phone to capture more informative images through the combination of wide-angle and ultra-wide-angle optical imaging systems and image fusion processing algorithms. The ultra-wide-angle lens assembly has the characteristics of a larger field-of-view and a larger depth of field. Where the size of the image plane of the sensor is the same, the larger the full field-of-view of the optical imaging lens assembly is, the more information is obtained by the imaging screen shot of the lens assembly, thereby improving the shooting performance of the electronic device. Meanwhile, the continuous thinning of optical imaging lens assemblies is conducive to the continuous development of miniaturization of electronic device.

SUMMARY

In one aspect, the present disclosure provides an optical imaging lens assembly which includes, sequentially from an object side to an image side along an optical axis, a first lens having positive refractive power; a second lens having refractive power; a third lens having positive refractive power with a concave object-side surface and a convex image-side surface; a fourth lens having positive refractive power with a concave object-side surface and a convex image-side surface; and a fifth lens having refractive power.

In one embodiment, half of a maximal field-of-view Semi-FOV of the optical imaging lens assembly satisfies: Semi-FOV>48°.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly satisfy: $1.0<TTL/ImgH<2.0$.

In one embodiment, an effective focal length f1 of the first lens and an effective focal length f3 of the third lens satisfy: $1.0<f1/f3<2.0$.

In one embodiment, a radius of curvature R5 of the object-side surface of the third lens, a radius of curvature R6 of the image-side surface of the third lens and a radius of curvature R2 of an image-side surface of the first lens satisfy: $1.0<(R5+R6)/R2<3.0$.

In one embodiment, a radius of curvature R7 of the object-side surface of the fourth lens, a radius of curvature R8 of the image-side surface of the fourth lens and a total effective focal length f of the optical imaging lens assembly satisfy: $-1.5<(R7+R8)/f<-1.0$.

In one embodiment, a center thickness CT3 of the third lens along the optical axis and a center thickness CT4 of the fourth lens along the optical axis satisfy: $CT3/CT4>2.9$.

In one embodiment, a spaced interval T12 between the first lens and the second lens along the optical axis, a spaced interval T23 between the second lens and the third lens along the optical axis and a spaced interval T34 between the third lens and the fourth lens along the optical axis satisfy: $0.5<T12/(T23+T34)<1.5$.

In one embodiment, a maximum effective radius DT11 of an object-side surface of the first lens and a maximum effective radius DT21 of an object-side surface of the second lens satisfy: $1.0<DT21/DT11<2.5$.

In one embodiment, a maximum effective radius DT32 of the image-side surface of the third lens and an on-axis distance SAG32 from an intersection of the image-side surface of the third lens and the optical axis to a vertex of an effective radius of the image-side surface of the third lens satisfy: $-2.5<DT32/SAG32<-1.5$.

In one embodiment, an on-axis distance SAG41 from an intersection of the object-side surface of the fourth lens and the optical axis to a vertex of an effective radius of the object-side surface of the fourth lens, an on-axis distance SAG42 from an intersection of the image-side surface of the fourth lens and the optical axis to a vertex of an effective radius of the image-side surface of the fourth lens and an on-axis distance SAG51 from an intersection of an object-side surface of the fifth lens and the optical axis to a vertex of an effective radius of the object-side surface of the fifth lens satisfy: $1.0<(|SAG41|+|SAG51|)/|SAG42|<3.5$.

In one embodiment, a center thickness CT3 of the third lens along the optical axis and an edge thickness ET3 of the third lens satisfy: $2.5<CT3/ET3<3.5$.

In one embodiment, a distance BFL along the optical axis from an image-side surface of the fifth lens to an imaging plane and a center thickness CT5 of the fifth lens along the optical axis satisfy: $0.5<BFL/CT5<4.0$.

The optical imaging lens assembly provided in the present disclosure includes a plurality of lenses, including the first lens to the fifth lens. By reasonably configuring half of the maximal field-of-view of the optical imaging lens assembly and optimizing the refractive power and surface shape of each lens, the optical imaging lens assembly has a large field-of-view and good image quality.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 5 illustrates a schematic structural view of an optical imaging lens assembly according to example 3 of the present disclosure;

FIGS. 6A to 6D illustrate a longitudinal aberration curve, an astigmatic curve, a distortion curve, and a lateral color curve of the optical imaging lens assembly of the example 3, respectively;

FIG. 7 illustrates a schematic structural view of an optical imaging lens assembly according to example 4 of the present disclosure;

DETAILED DESCRIPTION OF EMBODIMENTS

Figure 1:
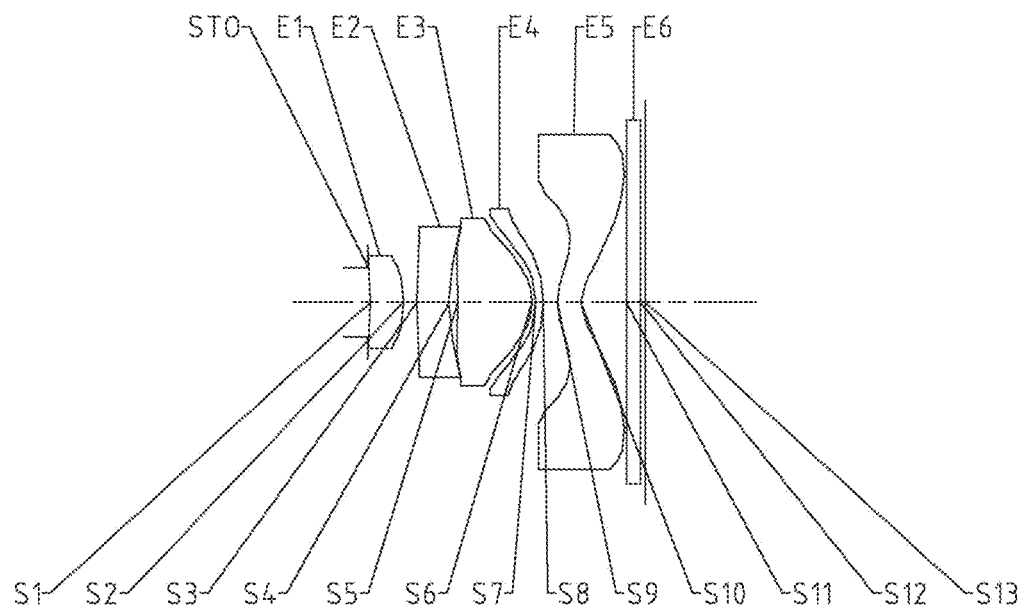
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include five lenses having refractive power, which are a first lens, a second lens, a third lens, a fourth lens and a fifth lens. The five lenses are arranged sequentially from an object side to an image side along an optical axis.

In an exemplary embodiment, the first lens may have positive refractive power; the second lens may have positive or negative refractive power; the third lens may have positive refractive power, an object-side surface thereof may be a concave surface, and an image-side surface thereof may be a convex surface; the fourth lens may have positive refractive power, an object-side surface thereof may be a concave surface, and an image-side surface thereof may be a convex surface; and the fifth lens may have may have positive or negative refractive power. By rationally configuring the refractive power and surface shape of each lens, the image quality of the optical imaging lens assembly may be improved.

In an exemplary embodiment, an image-side surface of the first lens may be a convex surface.

In an exemplary embodiment, an object-side surface of the second lens may be a convex surface.

In an exemplary embodiment, half of a maximal field-of-view Semi-FOV of the optical imaging lens assembly satisfies: Semi-FOV>48°. By reasonably setting half of the maximal field-of-view of the optical imaging lens assembly to be above 48°, it is beneficial to reduce the equivalent focal length of the optical imaging system and make the optical imaging system has a telephoto function, such that images with more screen details can be captured.

In an exemplary embodiment, a distance TTL along the optical axis from an object-side surface of the first lens to an imaging plane of the optical imaging lens assembly and half of a diagonal length ImgH of an effective pixel area on the imaging plane of the optical imaging lens assembly satisfy: 1.0<TTL/ImgH<2.0, for example, 1.4<TTL/ImgH<1.6. By setting the ratio of the distance along the optical axis from the object-side surface of the first lens to the imaging plane of the optical imaging lens assembly with respect to half of the diagonal length of the effective pixel area on the imaging plane of the optical imaging lens assembly to be within a reasonable value range, it is beneficial to control the total optical length of the optical imaging system to make it ultra-thin.

In an exemplary embodiment, an effective focal length f1 of the first lens and an effective focal length f3 of the third lens satisfy: 1.0<f1/f3<2.0. By reasonably setting the proportional relationship between the effective focal length of the first lens and the effective focal length of the third lens, the first lens and the third lens assume a certain positive refractive power, which is beneficial to the optical imaging system to converge the light beam and correct the off-axis coma and the distortion of the lens system.

In an exemplary embodiment, a radius of curvature R5 of the object-side surface of the third lens, a radius of curvature R6 of the image-side surface of the third lens and a radius of curvature R2 of an image-side surface of the first lens satisfy: 1.0<(R5+R6)/R2<3.0. By reasonably configuring the relationship among the radius of curvature of the object-side surface of the third lens, the radius of curvature of the image-side surface of the third lens and the radius of curvature of the image-side surface of the first lens, it is beneficial to reduce the ghost energy generated by light reflection on the lens surfaces of the first lens and the third lens.

In an exemplary embodiment, a radius of curvature R7 of the object-side surface of the fourth lens, a radius of curvature R8 of the image-side surface of the fourth lens and a total effective focal length f of the optical imaging lens assembly satisfy: −1.5<(R7+R8)/f<−1.0. By reasonably configuring the relationship among the radius of curvature of the object-side surface of the fourth lens, the radius of curvature of the image-side surface of the fourth lens and the total effective focal length of the optical imaging lens assembly, the radii of curvature of the object-side surface and the image-side surface of the fourth lens are controlled, which is beneficial for the fourth lens to assume a certain refractive power to effectively correct the on-axis chromatic aberration and the off-axis lateral color.

In an exemplary embodiment, a center thickness CT3 of the third lens along the optical axis and a center thickness CT4 of the fourth lens along the optical axis satisfy: CT3/CT4>2.9, for example, 10.00>CT3/CT4>2.9. By setting the ratio of the center thickness of the third lens along the optical axis to the center thickness of the fourth lens along the optical axis within a reasonable value range, it is beneficial to make the lenses' molding process meet the manufacturing process requirements under the condition of ensuring the total optical length.

In an exemplary embodiment, a spaced interval T12 between the first lens and the second lens along the optical axis, a spaced interval T23 between the second lens and the third lens along the optical axis and a spaced interval T34 between the third lens and the fourth lens along the optical axis satisfy: 0.5<T12/(T23+T34)<1.5, for example, 0.5<T12/(T23+T34)<1.1. By reasonably configuring the relationship among the spaced interval between the first lens and the second lens along the optical axis, the spaced interval between the second lens and the third lens along the optical axis and the spaced interval between the third lens and the fourth lens along the optical axis to satisfy the above conditional, it is beneficial to appropriately increase the air interval between the first lens and the second lens to make the optical imaging lens assembly meets the structural requirements for small front end. Further, it is beneficial to control the air interval between the second lens and the third lens and the air interval between the third lens and the fourth lens, so that the incident angle of the light beam on each surface is reduced under the condition of satisfying the total optical length of the optical imaging lens assembly, thereby reducing the tolerance sensitivity of the lenses.

In an exemplary embodiment, a maximum effective radius DT11 of an object-side surface of the first lens and a maximum effective radius DT21 of an object-side surface of the second lens satisfy: 1.0<DT21/DT11<2.5, for example, 1.4<DT21/DT11<2.2. By reasonably configuring the proportional relationship between the maximum effective radius of the object-side surface of the second lens and the maximum effective radius of the object-side surface of the first lens, it is beneficial to the smooth transition of the light incident from the first lens to the second lens, so as to prevent the vignetting stop from inducing large impact on the relative illumination of the edge field.

In an exemplary embodiment, a maximum effective radius DT32 of the image-side surface of the third lens and an on-axis distance SAG32 from an intersection of the image-side surface of the third lens and the optical axis to a vertex of an effective radius of the image-side surface of the third lens satisfy: −2.5<DT32/SAG32<−1.5, for example, −2.1<DT32/SAG32<−1.5. By reasonably configuring the proportional relationship between the maximum effective radius of the image-side surface of the third lens with respect to the on-axis distance from the intersection of the image-side surface of the third lens and the optical axis to the vertex of the effective radius of the image-side surface of the third lens, the aperture and sagittal height of the image-side surface of the third lens are constrained, which is beneficial to controlling the lens shape of the third lens to correct the Petzval field curvature of the optical system and the astigmatic in the tangential direction.

In an exemplary embodiment, an on-axis distance SAG41 from an intersection of the object-side surface of the fourth lens and the optical axis to a vertex of an effective radius of the object-side surface of the fourth lens, an on-axis distance SAG42 from an intersection of the image-side surface of the fourth lens and the optical axis to a vertex of an effective radius of the image-side surface of the fourth lens, and an on-axis distance SAG51 from an intersection of an object-side surface of the fifth lens and the optical axis to a vertex of an effective radius of the object-side surface of the fifth lens satisfy: 1.0<(|SAG41|+|SAG51|)/|SAG42|<3.5. By reasonably configuring the three parameters to satisfy the above-mentioned conditional, it is beneficial to correct the astigmatic in the sagittal direction of the optical system and the optical distortion of the optical imaging lens assembly.

In an exemplary embodiment, a center thickness CT3 of the third lens along the optical axis and an edge thickness ET3 of the third lens satisfy: 2.5<CT3/ET3<3.5. By reasonably configuring the proportional relationship between the center thickness of the third lens along the optical axis and the edge thickness of the third lens, it is beneficial to improve the manufacturability of the third lens and correct the Petzval field curvature and spherical aberration of the optical system.

In an exemplary embodiment, a distance BFL along the optical axis from an image-side surface of the fifth lens to an imaging plane and a center thickness CT5 of the fifth lens along the optical axis satisfy: 0.5<BFL/CT5<4.0, for example, 0.8<BFL/CT5<3.7. By reasonably configuring the proportional relationship between the distance along the optical axis from the image-side surface of the fifth lens to the imaging plane with respect to the center thickness of the fifth lens along the optical axis, it is beneficial to control the optical length while correcting the Petzval field curvature of the optical system.

In an exemplary embodiment, the above optical imaging lens assembly may further include a stop. The stop may be disposed at an appropriate position as required. For example, the stop is disposed between the object side and the first lens and near the object-side surface of the first lens. Optionally, the above optical imaging lens assembly may further include an optical filter for correcting the color deviation and/or a protective glass for protecting the photosensitive element located on an imaging plane.

In an exemplary embodiment, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

The optical imaging lens assembly according to the present disclosure has the characteristics of ultra-thin and wide-angle, achieves good image quality while having a larger field-of-view, and may be used in a combination of image fusion processing algorithms to obtain images with more abundant information.

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

Exemplary embodiments of the present disclosure also provide an electronic device including the above-described camera apparatus.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking five lenses as an example, the optical imaging lens assembly is not limited to include five lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 is a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, an optical filter E6 and an imaging plane S13, which are sequentially arranged from an object side to an image side along an optical axis.

The first lens E1 has positive refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 370.0000 | | | | |
| STO | Spherical | Infinite | 0.0304 | | | | |

TABLE 1-continued

| Surface number | Surface type | Radius of curvature | Thickness/ Distance | Material Refractive index | Abbe number | Focal length | Conic coefficient |
|---|---|---|---|---|---|---|---|
| S1 | Aspheric | −70.0603 | 0.4371 | 1.55 | 55.8 | 4.06 | −99.0000 |
| S2 | Aspheric | −2.1543 | 0.1741 | | | | 3.0640 |
| S3 | Aspheric | 2.2219 | 0.4206 | 1.68 | 19.2 | 600.09 | −22.1364 |
| S4 | Aspheric | 2.0631 | 0.1218 | | | | −5.6843 |
| S5 | Aspheric | −4.6826 | 0.9740 | 1.55 | 55.8 | 2.05 | −99.0000 |
| S6 | Aspheric | −0.9701 | 0.0500 | | | | −0.3419 |
| S7 | Aspheric | −1.3705 | 0.1000 | 1.67 | 20.4 | 944.13 | 0.2656 |
| S8 | Aspheric | −1.4074 | 0.1861 | | | | −0.3236 |
| S9 | Aspheric | 0.8869 | 0.3086 | 1.54 | 55.8 | −2.72 | −3.3685 |
| S10 | Aspheric | 0.4849 | 0.5992 | | | | −2.8665 |
| S11 | Spherical | Infinite | 0.1878 | 1.52 | 64.2 | | |
| S12 | Spherical | Infinite | 0.0617 | | | | |
| S13 | Spherical | Infinite | | | | | |

In this example, a total effective focal length f of the optical imaging lens assembly satisfies f=2.14 mm, a distance TTL along the optical axis from the object-side surface S1 of the first lens E1 to the imaging plane S13 satisfies TTL=3.62 mm, half of a diagonal length ImgH of an effective pixel area on the imaging plane S13 satisfies ImgH=2.43 mm, half of a maximal field-of-view Semi-FOV of the optical imaging lens assembly satisfies Semi-FOV=53.7°, and an aperture value Fno of the optical imaging lens assembly satisfies Fno=2.49.

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

TABLE 2

| Surface number | A4 | A6 | A8 | A10 | A12 |
|---|---|---|---|---|---|
| S1 | −1.4268E−02 | −4.9141E−04 | 1.1456E−05 | −1.3535E−05 | 1.4904E−06 |
| S2 | −5.3838E−02 | 3.5108E−03 | −3.3914E−04 | 4.0680E−05 | −1.0900E−05 |
| S3 | −8.7148E−02 | 1.9961E−02 | −1.2399E−03 | −5.3948E−04 | 1.0935E−04 |
| S4 | −4.2628E−02 | 1.2443E−02 | 2.8404E−04 | −1.1489E−03 | −2.8280E−04 |
| S5 | 7.4443E−02 | −1.4376E−04 | 1.2951E−03 | 4.8821E−04 | 1.1464E−04 |
| S6 | 2.2793E−02 | 8.4498E−02 | −1.7582E−02 | 7.3652E−03 | −3.7983E−03 |
| S7 | −1.1043E−01 | 1.0108E−01 | −1.2000E−02 | −2.2360E−03 | −4.4725E−04 |
| S8 | 6.9346E−01 | −3.0399E+00 | 5.1083E+00 | −4.7534E+00 | 4.4392E+00 |
| S9 | −1.2982E+00 | 2.3577E−01 | 4.2293E−02 | 5.5460E−03 | −8.4816E−03 |
| S10 | −1.0153E+00 | 1.3968E−01 | −7.4482E−02 | 6.4876E−03 | −1.1205E−03 |

| Surface number | A14 | A16 | A18 | A20 |
|---|---|---|---|---|
| S1 | −6.3689E−06 | −1.6502E−06 | −4.3608E−06 | −8.1792E−08 |
| S2 | −1.5300E−06 | −4.5991E−07 | 2.8460E−07 | 1.7810E−06 |
| S3 | 2.2462E−05 | −2.5790E−05 | −8.8835E−06 | |
| S4 | −4.3724E−04 | −1.7278E−04 | −9.0488E−07 | −5.2666E−06 |
| S5 | −3.7351E−05 | −1.4568E−04 | −2.3503E−05 | 1.6701E−05 |
| S6 | 1.9334E−03 | −5.1680E−04 | 2.0816E−04 | −5.2664E−05 |
| S7 | 2.1154E−03 | −1.1011E−03 | 2.7274E−04 | −3.1127E−05 |
| S8 | −5.0474E+00 | 4.0396E+00 | −1.6899E+00 | 2.8117E−01 |
| S9 | −7.4147E−03 | 4.4776E−03 | 3.2815E−03 | 3.4202E−04 |
| S10 | 2.8791E−04 | 3.1092E−03 | −6.7715E−05 | 5.3462E−04 |

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1+\sqrt{1-(k+1)c^2h^2}} + \Sigma A_i h^i \quad (1)$$

Figures 2A, 2B:
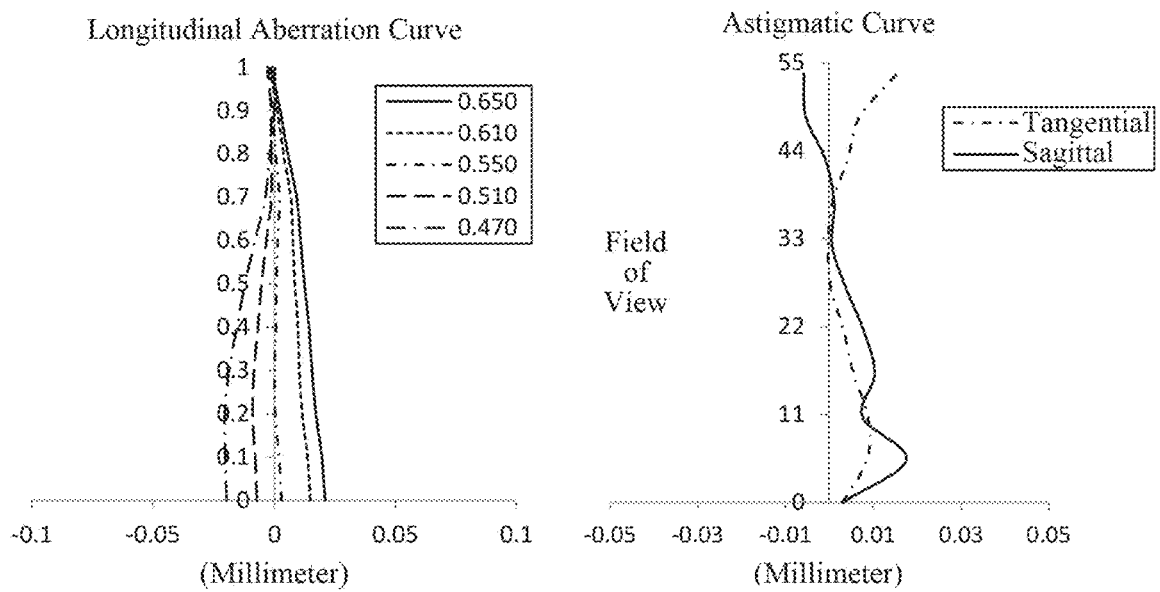
FIGS. 2A to 2D illustrate a longitudinal aberration curve, an astigmatic curve, a distortion curve, and a lateral color curve of the optical imaging lens assembly of the example 1, respectively.
Figure 2C:
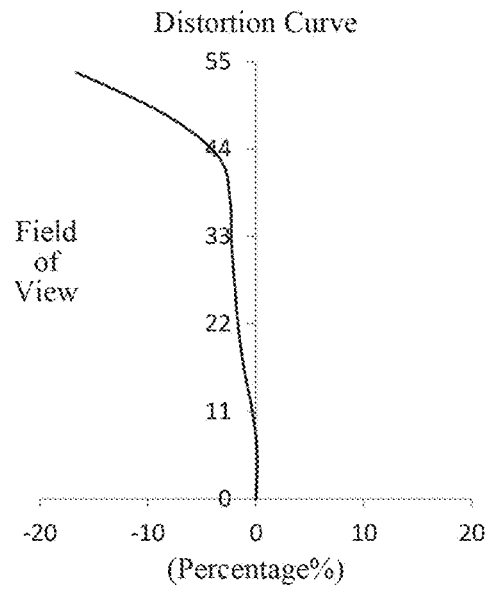
Figure 2D:
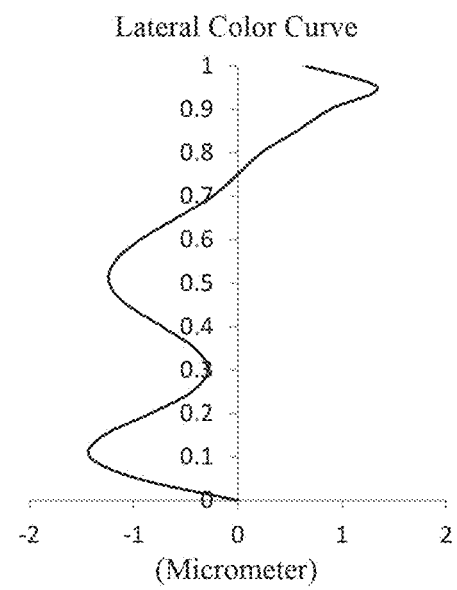

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different field-of-views. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
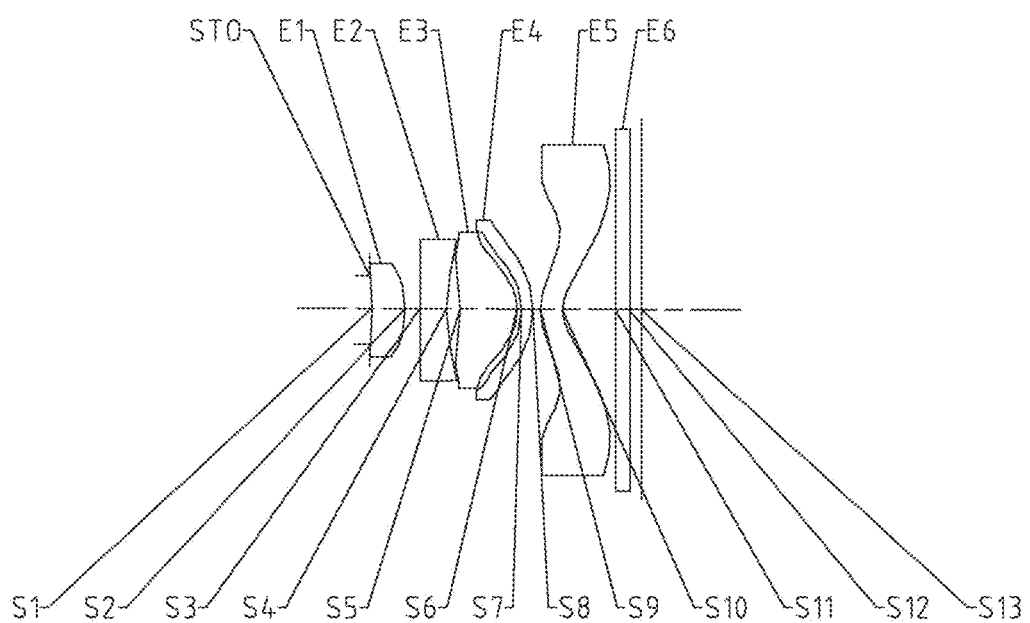
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, an optical filter E6 and an imaging plane S13, which are sequentially arranged from an object side to an image side along an optical axis.

The first lens E1 has positive refractive power, an object-side surface S1 thereof is a concave surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging lens assembly satisfies f=2.14 mm, a distance TTL along the optical axis from the object-side surface S1 of the first lens E1 to the imaging plane S13 satisfies TTL=3.53 mm, half of a diagonal length ImgH of an effective pixel area on the imaging plane S13 satisfies ImgH=2.45 mm, half of a maximal field-of-view Semi-FOV of the optical imaging lens assembly satisfies Semi-FOV=51.9°, and an aperture value Fno of the optical imaging lens assembly satisfies Fno=2.49.

Table 3 is a table illustrating basic parameters of the optical imaging lens assembly of example 2, wherein the units for the radius of curvature, the thickness/distance and the focal length are millimeter (mm).

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 370.0000 | | | | |
| STO | Spherical | Infinite | 0.0313 | | | | |
| S1 | Aspheric | −43.1295 | 0.4319 | 1.55 | 55.8 | 3.49 | −4.0538E+12 |
| S2 | Aspheric | −1.8318 | 0.1947 | | | | 2.8916 |
| S3 | Aspheric | 2.4813 | 0.3474 | 1.68 | 19.2 | −16.75 | −33.1818 |
| S4 | Aspheric | 1.9215 | 0.1801 | | | | −7.2754 |
| S5 | Aspheric | −2.1062 | 0.7436 | 1.55 | 55.8 | 2.35 | −37.4143 |
| S6 | Aspheric | −0.8976 | 0.0590 | | | | −0.3931 |
| S7 | Aspheric | −1.3142 | 0.1500 | 1.67 | 20.4 | 7.82 | 0.5443 |
| S8 | Aspheric | −1.0979 | 0.0986 | | | | −0.5053 |
| S9 | Aspheric | 0.7861 | 0.2888 | 1.54 | 55.8 | −2.75 | −2.6613 |
| S10 | Aspheric | 0.4472 | 0.6943 | | | | −3.1347 |
| S11 | Spherical | Infinite | 0.1878 | 1.52 | 64.2 | | |
| S12 | Spherical | Infinite | 0.1568 | | | | |
| S13 | Spherical | Infinite | | | | | |

In example 2, the object-side surface and the image-side surface of any one of the first lens E1 to the fifth lens E5 are aspheric. Table 4 below shows high-order coefficients A4, A6, A8, A10, A12, A14, A16, A18 and A20 applicable to each aspheric surface S1 to S10 in example 2.

TABLE 4

| Surface number | A4 | A6 | A8 | A10 | A12 |
|---|---|---|---|---|---|
| S1 | −1.4953E−02 | −5.9509E−04 | −1.3022E−06 | −8.0341E−06 | −2.1368E−05 |
| S2 | −5.2224E−02 | 2.7239E−03 | −3.4343E−04 | 1.7539E−05 | −8.3347E−06 |
| S3 | −9.2720E−02 | 1.8806E−02 | −1.7720E−04 | −6.9077E−04 | 1.5341E−04 |
| S4 | −4.9653E−02 | 1.2569E−02 | −2.3173E−03 | −1.1164E−03 | −8.1411E−05 |
| S5 | 5.6451E−02 | 1.6635E−02 | −3.9482E−03 | 5.4994E−04 | 1.7150E−04 |
| S6 | 7.5277E−02 | 1.1647E−01 | −2.0712E−02 | 4.3999E−03 | −2.8999E−03 |
| S7 | −7.3051E−02 | 1.2384E−01 | −1.4008E−02 | −1.0817E−03 | −6.8132E−04 |
| S8 | 7.2623E−01 | −3.0280E+00 | 5.1176E+00 | −4.7494E+00 | 4.4404E+00 |
| S9 | −1.2870E+00 | 2.4019E−01 | 5.0542E−04 | −2.4385E−02 | −1.7282E−02 |
| S10 | −9.7022E−01 | 9.6520E−02 | −1.1715E−02 | −3.3133E−03 | 2.3118E−03 |

TABLE 4-continued

| Surface number | A14 | A16 | A18 | A20 |
|---|---|---|---|---|
| S1 | −1.6395E−05 | 1.0783E−05 | −1.4734E−05 | −1.1643E−05 |
| S2 | −7.0154E−06 | −3.7365E−06 | −1.5175E−06 | −1.4702E−07 |
| S3 | 6.6936E−05 | 1.1872E−05 | 2.1428E−05 | 1.6833E−06 |
| S4 | −1.7703E−04 | −7.4297E−05 | −5.3118E−05 | −3.4534E−05 |
| S5 | −8.4264E−05 | −9.8585E−06 | −2.9744E−05 | 8.1853E−06 |
| S6 | 1.9648E−03 | −3.6714E−04 | 1.2699E−04 | −1.6103E−05 |
| S7 | 1.7914E−03 | −8.0244E−04 | 1.4921E−04 | −1.9515E−07 |
| S8 | −5.0478E+00 | 4.0384E+00 | −1.6913E+00 | 2.7990E−01 |
| S9 | −2.3145E−03 | 3.3958E−03 | 7.1231E−04 | −9.6672E−04 |
| S10 | −1.1275E−02 | −8.2141E−04 | −4.3683E−03 | −5.9503E−05 |

Figure 4A:
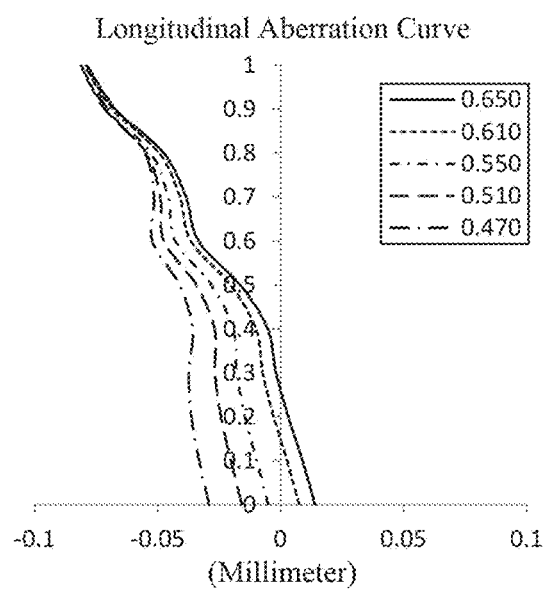
FIGS. 4A to 4D illustrate a longitudinal aberration curve, an astigmatic curve, a distortion curve, and a lateral color curve of the optical imaging lens assembly of the example 2, respectively.
Figure 4B:
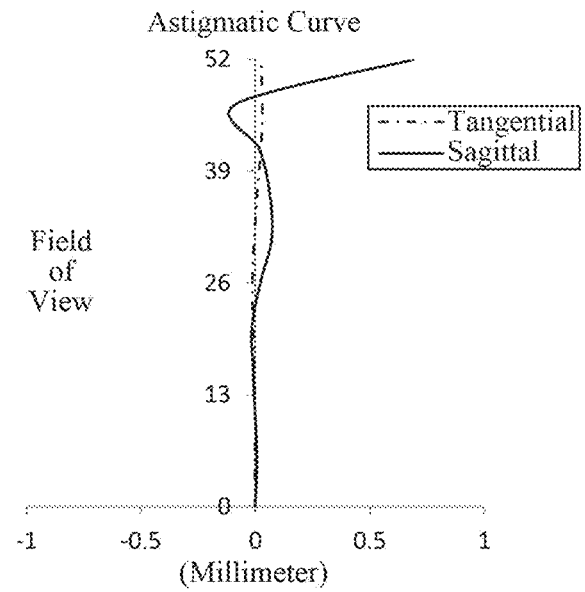
Figure 4C:
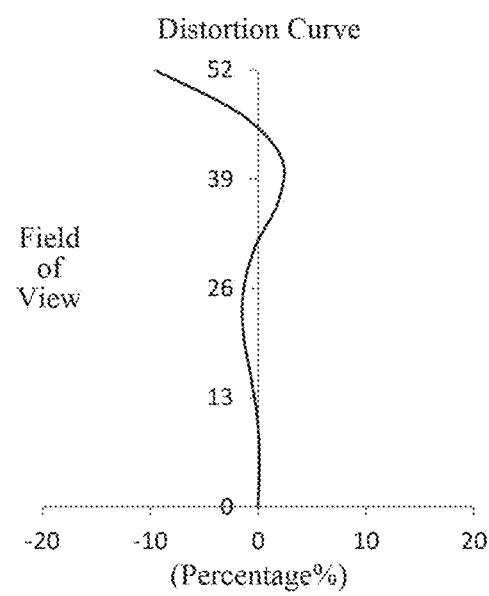
Figure 4D:
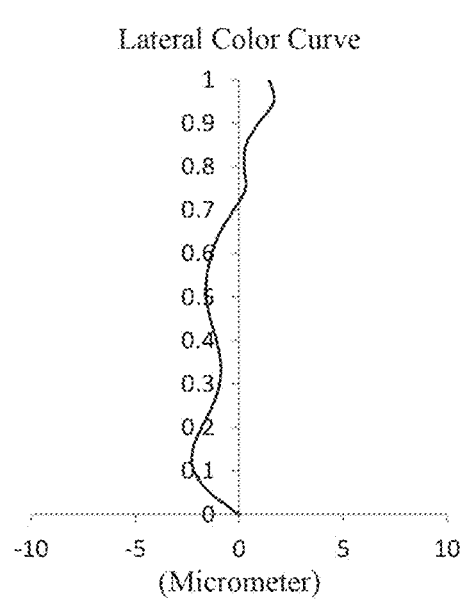

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different field-of-views. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, an optical filter E6 and an imaging plane S13, which are sequentially arranged from an object side to an image side along an optical axis.

The first lens E1 has positive refractive power, an object-side surface S1 thereof is a convex surface, and an image-side surface S2 thereof is a convex surface. The second lens E2 has positive refractive power, an object-side surface S3 thereof is a convex surface, and an image-side surface S4 thereof is a convex surface. The third lens E3 has positive refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging lens assembly satisfies f=2.10 mm, a distance TTL along the optical axis from the object-side surface S1 of the first lens E1 to the imaging plane S13 satisfies TTL=3.40 mm, half of a diagonal length ImgH of an effective pixel area on the imaging plane S13 satisfies ImgH=2.17 mm, half of a maximal field-of-view Semi-FOV of the optical imaging lens assembly satisfies Semi-FOV=48.1°, and an aperture value Fno of the optical imaging lens assembly satisfies Fno=2.49.

Table 5 is a table illustrating basic parameters of the optical imaging lens assembly of example 3, wherein the units for the radius of curvature, the thickness/distance and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 370.0000 | | | | |
| STO | Spherical | Infinite | 0.1358 | | | | |
| S1 | Aspheric | 26.5728 | 0.2765 | 1.55 | 55.8 | 3.09 | 98.8500 |
| S2 | Aspheric | −1.7952 | 0.1553 | | | | 5.1025 |
| S3 | Aspheric | 12.7597 | 0.2149 | 1.68 | 19.2 | 9.70 | −76.5503 |
| S4 | Aspheric | −13.5162 | 0.1019 | | | | −81.0193 |
| S5 | Aspheric | −1.3936 | 0.8424 | 1.55 | 55.8 | 2.80 | −27.4225 |
| S6 | Aspheric | −0.8841 | 0.1000 | | | | −0.3767 |
| S7 | Aspheric | −1.3305 | 0.1502 | 1.67 | 20.4 | 12.67 | 0.4720 |
| S8 | Aspheric | −1.2016 | 0.1000 | | | | −0.5630 |
| S9 | Aspheric | 2.5378 | 0.5629 | 1.54 | 55.8 | −2.25 | −0.0157 |
| S10 | Aspheric | 0.7561 | 0.5616 | | | | −4.8447 |
| S11 | Spherical | Infinite | 0.1878 | 1.52 | 64.2 | | |
| S12 | Spherical | Infinite | 0.1465 | | | | |
| S13 | Spherical | Infinite | | | | | |

In example 3, the object-side surface and the image-side surface of any one of the first lens E1 to the fifth lens E5 are aspheric. Table 6 below shows high-order coefficients A4, A6, A8, A10, A12, A14, A16, A18 and A20 applicable to each aspheric surface S1 to S10 in example 3.

TABLE 6

| Surface number | A4 | A6 | A8 | A10 | A12 |
|---|---|---|---|---|---|
| S1 | −2.5510E−02 | −1.9727E−03 | −1.9374E−04 | −2.7948E−05 | −7.6061E−06 |
| S2 | −6.9756E−02 | −1.1974E−03 | −7.4877E−04 | −2.1084E−04 | −2.8161E−05 |
| S3 | −1.3478E−01 | 1.7367E−02 | −8.8546E−04 | −1.8859E−03 | 4.5382E−04 |
| S4 | −5.8249E−02 | 1.5751E−05 | 7.4727E−04 | −4.7598E−03 | 5.4974E−04 |
| S5 | 5.6259E−02 | 1.0842E−02 | 1.7441E−03 | −5.3151E−04 | −1.3107E−03 |
| S6 | 9.1085E−02 | 5.6055E−02 | −7.8437E−03 | 4.1334E−03 | 1.3525E−03 |
| S7 | −8.3121E−02 | 1.0476E−01 | −1.4611E−02 | −3.3214E−03 | 2.0618E−03 |
| S8 | 7.3857E−01 | −3.0196E+00 | 5.1226E+00 | −4.7491E+00 | 4.4375E+00 |
| S9 | −6.1273E−01 | 4.0630E−01 | −5.4164E−01 | −8.2787E−03 | 1.4006E−01 |
| S10 | −6.8721E−01 | −3.2937E−02 | 3.7355E−02 | 1.0213E−02 | 4.7377E−02 |

| Surface number | A14 | A16 | A18 | A20 |
|---|---|---|---|---|
| S1 | −1.0149E−07 | 1.0870E−07 | 8.4611E−07 | −1.5145E−07 |
| S2 | 1.9135E−06 | 1.1975E−06 | 8.0419E−07 | 2.0952E−06 |
| S3 | 2.6047E−05 | −1.6354E−05 | −2.5651E−05 | 9.1316E−06 |
| S4 | −1.3451E−04 | −4.5530E−05 | −6.6025E−05 | 3.1556E−05 |
| S5 | 7.9095E−04 | −1.5504E−04 | −1.7294E−05 | 4.7364E−06 |
| S6 | 5.1581E−04 | 2.5056E−04 | −3.1134E−04 | −3.6993E−06 |
| S7 | 6.3190E−04 | −2.3400E−05 | −1.8224E−04 | 6.6026E−05 |
| S8 | −5.0512E+00 | 4.0363E+00 | −1.6906E+00 | 2.8489E−01 |
| S9 | −2.2760E−01 | −1.0490E−01 | 6.5187E−02 | 7.3179E−02 |
| S10 | 1.3871E−02 | 2.0281E−02 | 3.4124E−03 | 4.4739E−03 |

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different field-of-views. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, an optical filter E6 and an imaging plane S13, which are sequentially arranged from an object side to an image side along an optical axis.

The first lens E1 has positive refractive power, an object-side surface S1 thereof is a concave surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging lens assembly satisfies f=2.16 mm, a distance TTL along the optical axis from the object-side surface S1 of the first lens E1 to the imaging plane S13 satisfies TTL=3.86 mm, half of a diagonal length ImgH of an effective pixel area on the imaging plane S13 satisfies ImgH=2.67 mm, half of a maximal field-of-view Semi-FOV of the optical imaging lens assembly satisfies Semi-FOV=51.2°, and an aperture value Fno of the optical imaging lens assembly satisfies Fno=2.49.

Table 7 is a table illustrating basic parameters of the optical imaging lens assembly of example 4, wherein the units for the radius of curvature, the thickness/distance and the focal length are millimeter (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 370.0000 | | | | |
| STO | Spherical | Infinite | 0.0206 | | | | |
| S1 | Aspheric | −7.8551 | 0.4249 | 1.55 | 55.8 | 3.45 | −2.0000 |
| S2 | Aspheric | −1.5477 | 0.1394 | | | | 2.8561 |
| S3 | Aspheric | 3.7282 | 0.3152 | 1.68 | 19.2 | −14.70 | −15.7756 |
| S4 | Aspheric | 2.6211 | 0.1766 | | | | −7.8337 |
| S5 | Aspheric | −2.1135 | 0.7424 | 1.55 | 55.8 | 2.37 | −34.2861 |
| S6 | Aspheric | −0.9015 | 0.0991 | | | | −0.3934 |
| S7 | Aspheric | −1.3238 | 0.1504 | 1.67 | 20.4 | 7.71 | 0.5357 |
| S8 | Aspheric | −1.1008 | 0.5941 | | | | −0.4675 |
| S9 | Aspheric | −0.2421 | 0.2814 | 1.54 | 55.8 | 9.29 | −3.3029 |
| S10 | Aspheric | −0.3247 | 0.6436 | | | | −3.2006 |
| S11 | Spherical | Infinite | 0.1878 | 1.52 | 64.2 | | |
| S12 | Spherical | Infinite | 0.1068 | | | | |
| S13 | Spherical | Infinite | | | | | |

In example 4, the object-side surface and the image-side surface of any one of the first lens E1 to the fifth lens E5 are aspheric. Table 8 below shows high-order coefficients A4, A6, A8, A10, A12, A14, A16, A18 and A20 applicable to each aspheric surface S1 to S10 in example 4.

TABLE 8

| Surface number | A4 | A6 | A8 | A10 | A12 |
|---|---|---|---|---|---|
| S1 | −1.5125E−02 | −6.3114E−04 | −8.2793E−05 | −2.1398E−04 | −1.7316E−04 |
| S2 | −5.1152E−02 | 3.0051E−03 | −3.4985E−05 | 7.8831E−04 | −4.8695E−05 |
| S3 | −9.2780E−02 | 1.8316E−02 | −3.4576E−05 | 3.0091E−05 | 1.7596E−04 |
| S4 | −5.0042E−02 | 1.3018E−02 | −2.1538E−03 | 1.7437E−03 | 1.6418E−04 |
| S5 | 5.7132E−02 | 1.6595E−02 | −4.0986E−03 | 5.9392E−04 | 1.5995E−04 |
| S6 | 7.4290E−02 | 1.1629E−01 | −2.0455E−02 | 4.2317E−03 | −2.6962E−03 |
| S7 | −7.1350E−02 | 1.2403E−01 | −1.4194E−02 | −8.3953E−04 | −4.8217E−04 |
| S8 | 7.1420E−01 | −3.0320E+00 | 5.1165E+00 | −4.7489E+00 | 4.4407E+00 |
| S9 | −9.6391E+01 | −4.1007E+01 | 6.6069E−04 | 1.1621E+01 | 6.5463E+00 |
| S10 | −9.7864E−01 | −3.5262E−01 | −5.6358E−01 | −4.8205E−03 | 1.1257E−03 |

| Surface number | A14 | A16 | A18 | A20 |
|---|---|---|---|---|
| S1 | 5.2172E−05 | −1.4860E−04 | −4.2624E−04 | 2.6499E−04 |
| S2 | 2.3594E−04 | 1.9479E−04 | −6.5316E−06 | 8.7591E−06 |
| S3 | −2.7993E−04 | 3.2916E−04 | 6.3544E−04 | −6.3319E−04 |
| S4 | −8.9591E−04 | −6.4360E−04 | −1.3026E−04 | 4.3341E−04 |
| S5 | −4.9594E−05 | −1.2239E−05 | −4.0196E−05 | 9.7898E−06 |
| S6 | 1.8466E−03 | −2.5384E−04 | 7.3422E−05 | −1.7102E−04 |
| S7 | 1.6333E−03 | −8.6455E−04 | 2.1724E−04 | 2.6975E−05 |
| S8 | −5.0476E+00 | 4.0384E+00 | −1.6913E+00 | 2.7995E−01 |
| S9 | 1.3775E+00 | 2.4231E−03 | 8.9187E−04 | −1.6639E−03 |
| S10 | −2.3224E−02 | −1.0307E−03 | −4.2814E−03 | −7.6755E−04 |

Figure 8A:
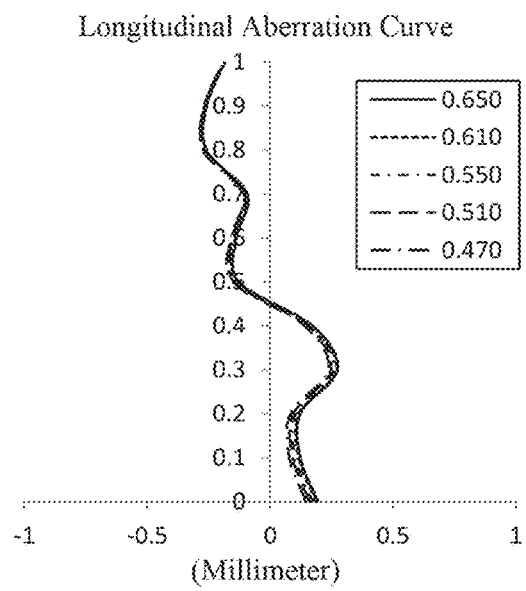
FIGS. 8A to 8D illustrate a longitudinal aberration curve, an astigmatic curve, a distortion curve, and a lateral color curve of the optical imaging lens assembly of the example 4, respectively.
Figure 8B:
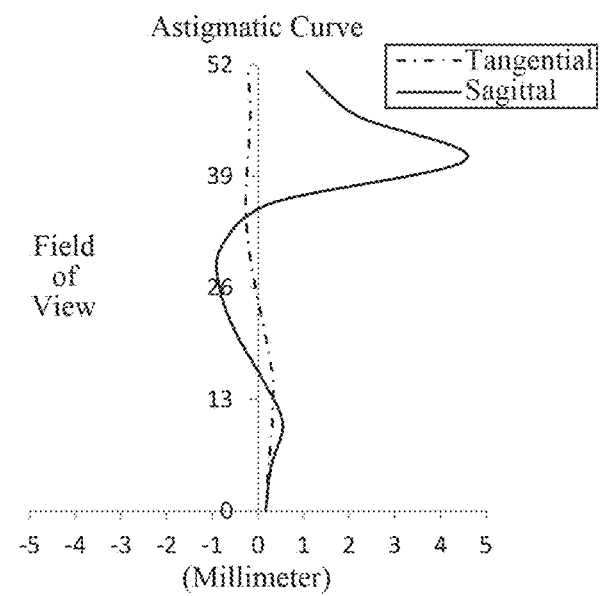
Figure 8C:
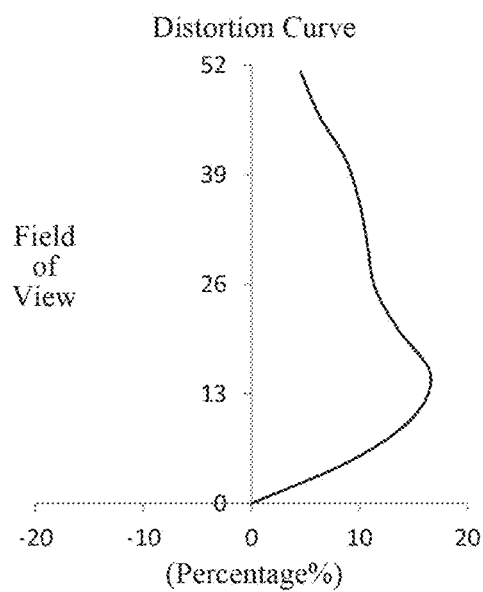
Figure 8D:
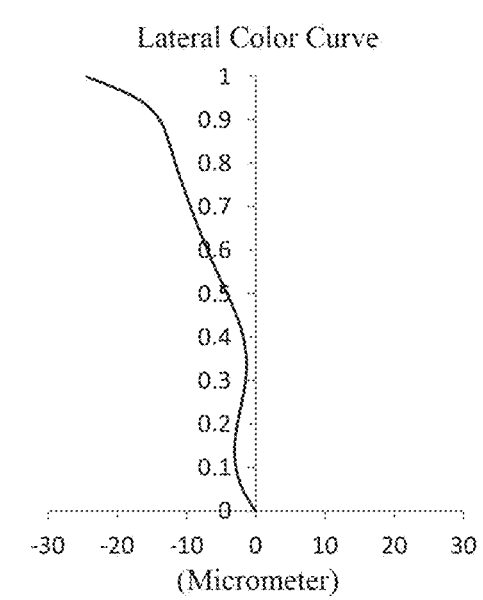

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different field-of-views. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
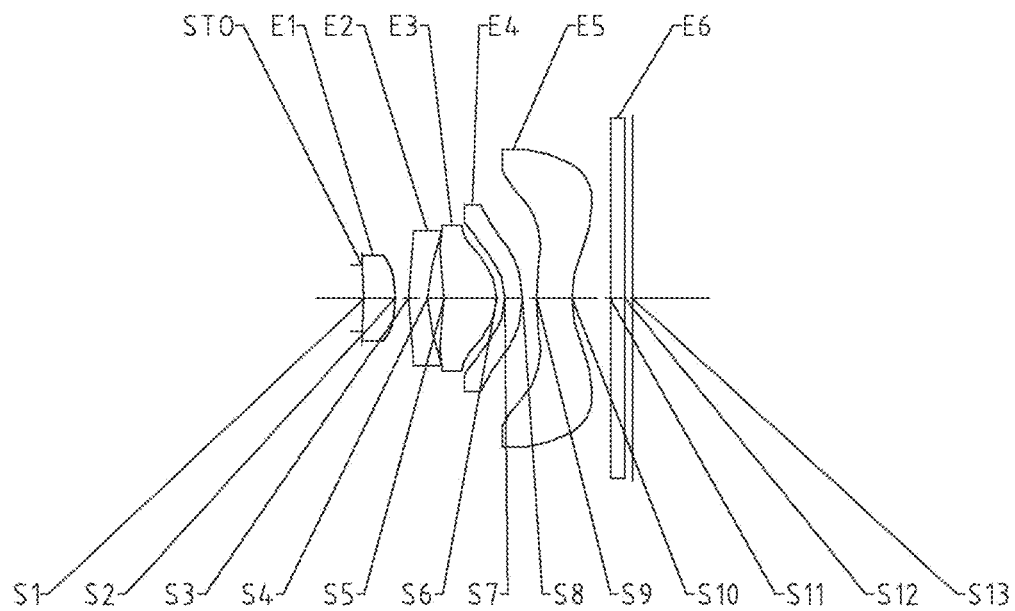
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, an optical filter E6 and an imaging plane S13, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging lens assembly satisfies f=2.14 mm, a distance TTL along the optical axis from the object-side surface S1 of the first lens E1 to the imaging plane S13 satisfies TTL=3.56 mm, half of a diagonal length ImgH of an effective pixel area on the imaging plane S13 satisfies ImgH=2.43 mm, half of a maximal field-of-view Semi-FOV of the optical imaging lens assembly satisfies Semi-FOV=52.0°, and an aperture value Fno of the optical imaging lens assembly satisfies Fno=2.49.

Table 9 is a table illustrating basic parameters of the optical imaging lens assembly of example 5, wherein the units for the radius of curvature, the thickness/distance and the focal length are millimeter (mm).

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 370.0000 | | | | |
| STO | Spherical | Infinite | 0.0259 | | | | |
| S1 | Aspheric | 103.7408 | 0.4224 | 1.55 | 55.8 | 3.24 | −99.0000 |
| S2 | Aspheric | −1.7977 | 0.1726 | | | | 3.2419 |
| S3 | Aspheric | 1.3922 | 0.2497 | 1.68 | 19.2 | −15.83 | −20.7298 |
| S4 | Aspheric | 1.1432 | 0.2158 | | | | −7.0365 |
| S5 | Aspheric | −3.1948 | 0.7029 | 1.55 | 55.8 | 2.08 | −19.2118 |
| S6 | Aspheric | −0.9035 | 0.1056 | | | | −0.4194 |
| S7 | Aspheric | −1.2671 | 0.2361 | 1.67 | 20.4 | 11.99 | 0.4999 |
| S8 | Aspheric | −1.1754 | 0.1866 | | | | −0.4565 |
| S9 | Aspheric | −7.2417 | 0.4696 | 1.54 | 55.8 | −3.37 | −99.0000 |
| S10 | Aspheric | 2.4675 | 0.5145 | | | | 0.1724 |
| S11 | Spherical | Infinite | 0.1878 | 1.52 | 64.2 | | |
| S12 | Spherical | Infinite | 0.1000 | | | | |
| S13 | Spherical | Infinite | | | | | |

In example 5, the object-side surface and the image-side surface of any one of the first lens E1 to the fifth lens E5 are aspheric. Table 10 below shows high-order coefficients A4, A6, A8, A10, A12, A14, A16, A18 and A20 applicable to each aspheric surface S1 to S10 in example 5.

TABLE 10

| Surface number | A4 | A6 | A8 | A10 | A12 |
|---|---|---|---|---|---|
| S1 | −1.5915E−02 | −7.1097E−04 | −5.1963E−07 | −1.3597E−05 | 5.1505E−06 |
| S2 | −5.4538E−02 | 3.8976E−03 | −6.5696E−04 | 1.0444E−04 | −2.0984E−05 |
| S3 | −8.6311E−02 | 1.9603E−02 | −4.0199E−04 | −9.9313E−04 | 4.4605E−04 |
| S4 | −4.1149E−02 | 1.0916E−02 | −3.2398E−03 | −1.3389E−03 | −4.2776E−04 |
| S5 | 6.2379E−02 | 2.1487E−02 | −4.1404E−03 | −3.5202E−03 | −4.5094E−03 |
| S6 | 8.8090E−02 | 1.1755E−01 | −1.6229E−02 | 3.8230E−03 | −9.3659E−04 |
| S7 | −6.4994E−02 | 1.3219E−01 | −1.9826E−02 | 2.0954E−03 | −1.5640E−03 |
| S8 | 6.9161E−01 | −3.0328E+00 | 5.1194E+00 | −4.7478E+00 | 4.4418E+00 |
| S9 | −5.9820E−01 | 5.9906E−02 | 5.4430E−02 | −1.7778E−01 | 4.6278E−02 |
| S10 | −1.1994E+00 | −2.8792E−01 | 1.9189E−02 | −9.4295E−02 | 2.5428E−02 |

| Surface number | A14 | A16 | A18 | A20 |
|---|---|---|---|---|
| S1 | −2.8095E−06 | −5.3871E−07 | −4.0142E−06 | −6.1673E−07 |
| S2 | 9.0828E−06 | 7.0252E−06 | 3.7614E−06 | 2.7297E−06 |
| S3 | −4.5231E−05 | −7.5458E−05 | −8.2763E−05 | −3.5450E−05 |
| S4 | −3.2356E−04 | −6.5345E−05 | −2.3637E−06 | −2.1643E−05 |
| S5 | −4.3996E−04 | −3.3014E−04 | 9.7486E−05 | 6.3324E−05 |
| S6 | 3.7286E−03 | 2.6506E−04 | −1.2207E−04 | −3.2073E−04 |
| S7 | 1.6072E−03 | −4.4700E−04 | 5.9967E−05 | 3.5280E−05 |
| S8 | −5.0467E+00 | 4.0392E+00 | −1.6907E+00 | 2.8028E−01 |
| S9 | −2.7467E−02 | 3.3522E−02 | −1.3780E−02 | 2.0150E−02 |
| S10 | −3.5280E−02 | 1.3088E−02 | −1.7311E−03 | 5.7240E−03 |

Figure 10A:
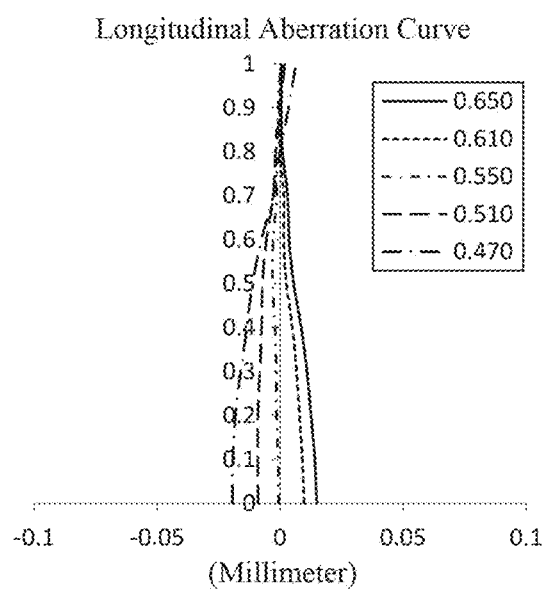
FIGS. 10A to 10D illustrate a longitudinal aberration curve, an astigmatic curve, a distortion curve, and a lateral color curve of the optical imaging lens assembly of the example 5, respectively.
Figure 10B:
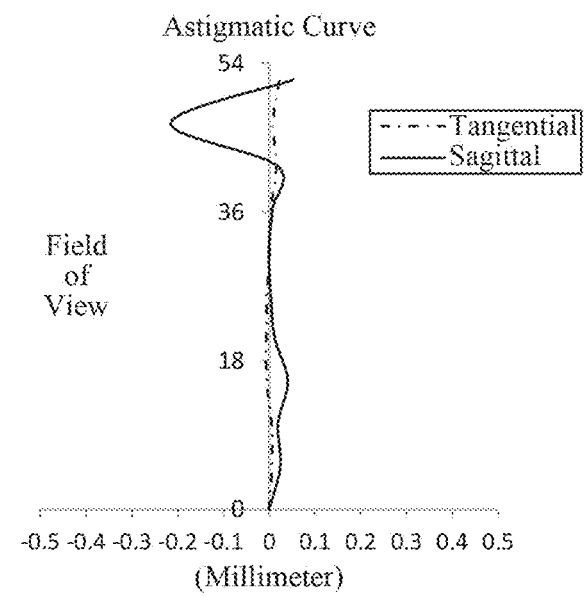
Figure 10C:
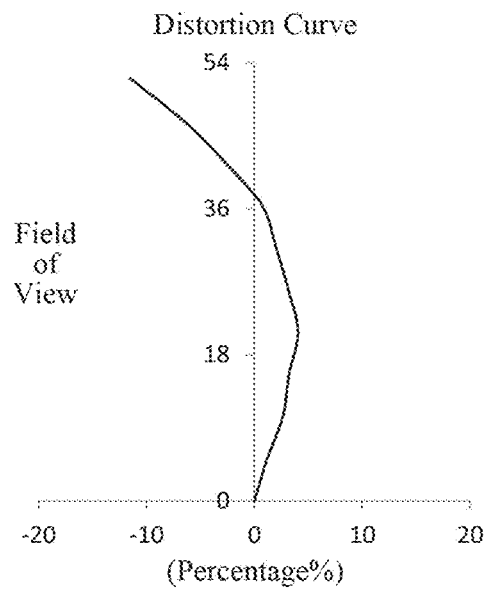
Figure 10D:
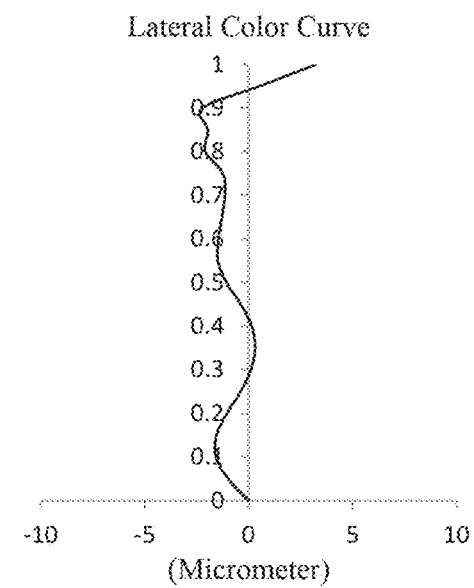

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different field-of-views. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

Figure 11:
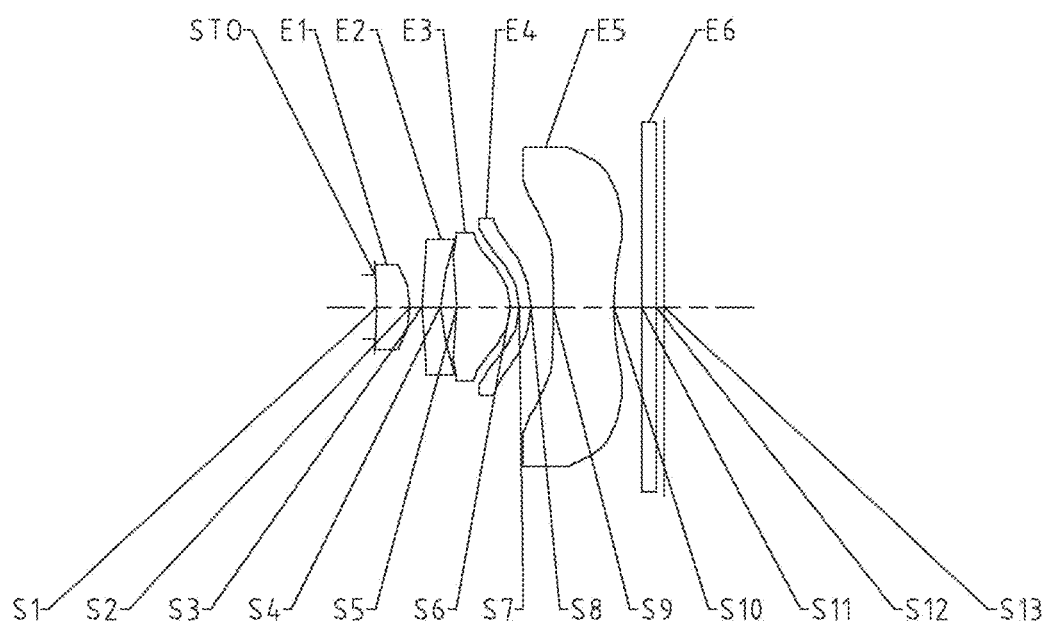
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, an optical filter E6 and an imaging plane S13, which are sequentially arranged from an object side to an image side along an optical axis.

The first lens E1 has positive refractive power, an object-side surface S1 thereof is a concave surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging lens assembly satisfies f=2.04 mm, a distance TTL along the optical axis from the object-side surface S1 of the first lens E1 to the imaging plane S13 satisfies TTL=3.68 mm, half of a diagonal length ImgH of an effective pixel area on the imaging plane S13 satisfies ImgH=2.43 mm, half of a maximal field-of-view Semi-FOV of the optical imaging lens assembly satisfies Semi-FOV=52.4°, and an aperture value Fno of the optical imaging lens assembly satisfies Fno=2.49.

Table 11 is a table illustrating basic parameters of the optical imaging lens assembly of example 6, wherein the units for the radius of curvature, the thickness/distance and the focal length are millimeter (mm).

TABLE 11

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | 370.0000 | | | | |
| STO | Spherical | Infinite | 0.0268 | | | | |
| S1 | Aspheric | −171.6969 | 0.4185 | 1.55 | 55.8 | 3.22 | 99.0000 |
| S2 | Aspheric | −1.7409 | 0.1636 | | | | 2.7251 |
| S3 | Aspheric | 1.4568 | 0.2371 | 1.68 | 19.2 | −14.12 | −20.6995 |
| S4 | Aspheric | 1.1813 | 0.2085 | | | | −7.0911 |
| S5 | Aspheric | −3.2390 | 0.6874 | 1.55 | 55.8 | 2.09 | −29.6146 |
| S6 | Aspheric | −0.9069 | 0.1109 | | | | −0.4155 |
| S7 | Aspheric | −1.2787 | 0.1500 | 1.67 | 20.4 | 11.75 | 0.4944 |
| S8 | Aspheric | −1.1511 | 0.2886 | | | | −0.4969 |
| S9 | Aspheric | −2.0553 | 0.7826 | 1.54 | 55.8 | −4.99 | −55.3559 |
| S10 | Aspheric | −10.0000 | 0.3500 | | | | 11.2900 |
| S11 | Spherical | Infinite | 0.1878 | 1.52 | 64.2 | | |
| S12 | Spherical | Infinite | 0.1000 | | | | |
| S13 | Spherical | Infinite | | | | | |

In example 6, the object-side surface and the image-side surface of any one of the first lens E1 to the fifth lens E5 are aspheric. Table 12 below shows high-order coefficients A4, A6, A8, A10, A12, A14, A16, A18 and A20 applicable to each aspheric surface S1 to S10 in example 6.

TABLE 12

| Surface number | A4 | A6 | A8 | A10 | A12 |
|---|---|---|---|---|---|
| S1 | −1.5606E−02 | −6.5877E−04 | −3.5035E−06 | −1.3004E−05 | 1.9728E−06 |
| S2 | −5.2413E−02 | 4.0426E−03 | −6.9542E−04 | 8.9541E−05 | −2.0332E−05 |
| S3 | −8.5198E−02 | 1.9755E−02 | −1.5358E−03 | −9.6166E−04 | 3.8158E−04 |
| S4 | −3.9399E−02 | 1.1424E−02 | −2.9260E−03 | −1.1573E−03 | −1.9205E−04 |

TABLE 12-continued

| | | | | | |
|---|---|---|---|---|---|
| S5 | 6.4060E−02 | 2.0232E−02 | −2.8745E−03 | 9.4534E−05 | 2.2394E−04 |
| S6 | 8.9895E−02 | 1.1286E−01 | −1.5321E−02 | 6.0570E−03 | −1.1752E−03 |
| S7 | −6.7541E−02 | 1.2792E−01 | −1.8121E−02 | 2.6906E−03 | −1.6158E−03 |
| S8 | 6.9729E−01 | −3.0275E+00 | 5.1210E+00 | −4.7467E+00 | 4.4424E+00 |
| S9 | −3.9446E−01 | 4.0882E−02 | −2.2417E−02 | −1.0842E−01 | 5.5223E−02 |
| S10 | −1.7776E−01 | −4.1042E−01 | 9.2789E−02 | −9.1903E−02 | 6.4504E−02 |

| Surface number | A14 | A16 | A18 | A20 |
|---|---|---|---|---|
| S1 | −5.4221E−06 | −3.5314E−06 | −6.5625E−06 | −2.8641E−06 |
| S2 | 2.9164E−06 | 3.2463E−06 | 3.0592E−07 | 3.3179E−06 |
| S3 | −2.0940E−05 | 1.2750E−05 | −1.7577E−05 | −1.1905E−06 |
| S4 | −3.2804E−04 | −3.9457E−05 | −3.3316E−05 | −5.6867E−06 |
| S5 | −2.9485E−04 | −1.6102E−04 | 5.6484E−05 | 1.2766E−05 |
| S6 | 2.9386E−03 | −6.8145E−05 | −4.9013E−05 | −1.6407E−04 |
| S7 | 1.7088E−03 | −4.0479E−04 | 4.2914E−05 | 3.1859E−05 |
| S8 | −5.0465E+00 | 4.0392E+00 | −1.6908E+00 | 2.8018E−01 |
| S9 | −2.5091E−02 | 1.7710E−02 | −1.0737E−02 | 1.5127E−02 |
| S10 | −2.5746E−02 | 9.6977E−03 | −9.0833E−03 | 3.6216E−03 |

Figure 12A:
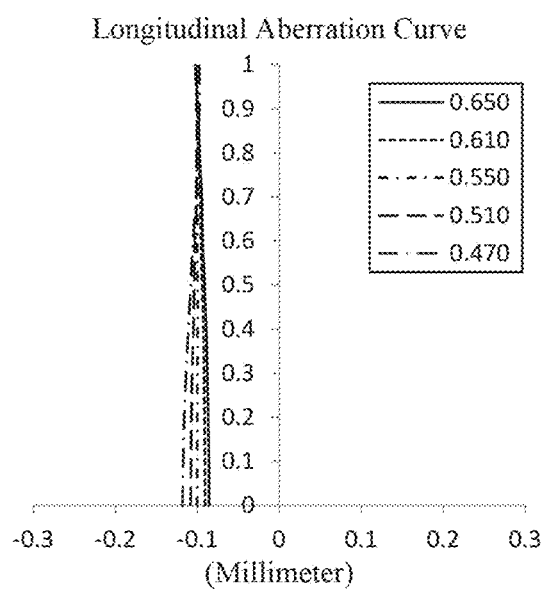
FIGS. 12A to 12D illustrate a longitudinal aberration curve, an astigmatic curve, a distortion curve, and a lateral color curve of the optical imaging lens assembly of the example 6, respectively.
Figure 12B:
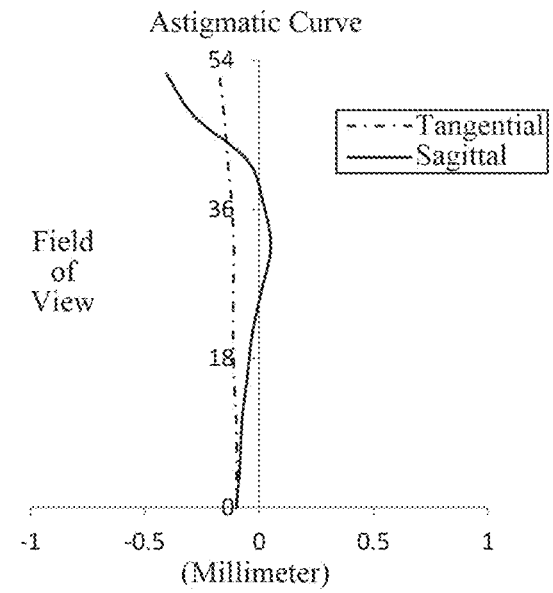
Figure 12C:
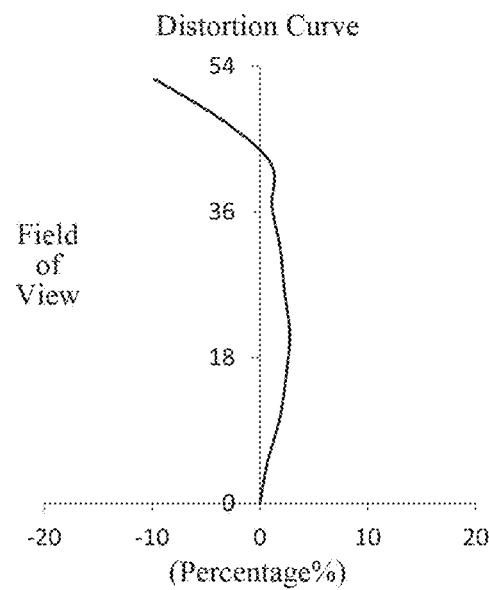
Figure 12D:
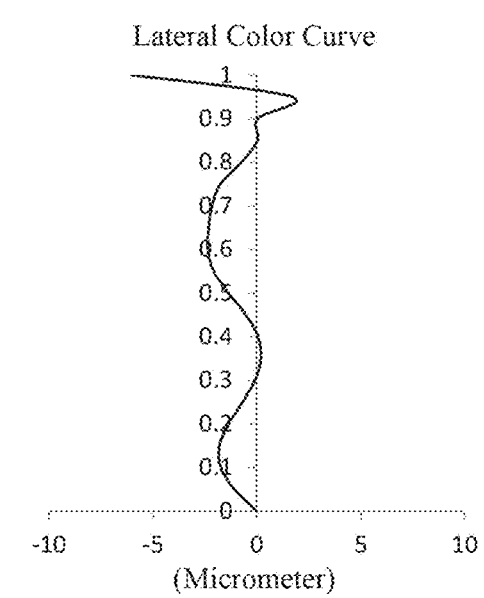

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different field-of-views. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

In view of the above, examples 1 to 6 respectively satisfy the relationship shown in Table 13.

TABLE 13

| | Example | | | | | |
|---|---|---|---|---|---|---|
| Conditional | 1 | 2 | 3 | 4 | 5 | 6 |
| TTL/ImgH | 1.49 | 1.44 | 1.57 | 1.45 | 1.46 | 1.51 |
| f1/f3 | 1.98 | 1.48 | 1.11 | 1.46 | 1.56 | 1.54 |
| (R5 + R6)/R2 | 2.62 | 1.64 | 1.27 | 1.95 | 2.28 | 2.38 |
| (R7 + R8)/f | −1.30 | −1.13 | −1.21 | −1.12 | −1.14 | −1.19 |
| CT3/CT4 | 9.74 | 4.96 | 5.61 | 4.94 | 2.98 | 4.58 |
| T12/(T23 + T34) | 1.01 | 0.81 | 0.77 | 0.51 | 0.54 | 0.51 |
| DT21/DT11 | 1.83 | 1.77 | 1.49 | 2.11 | 1.81 | 1.84 |
| DT32/SAG32 | −1.78 | −1.93 | −1.61 | −1.87 | −2.07 | −2.04 |
| (\|SAG41\| + \|SAG51\|)/\|SAG42\| | 1.79 | 1.04 | 1.75 | 3.12 | 1.75 | 1.87 |
| CT3/ET3 | 2.98 | 2.98 | 3.32 | 2.54 | 2.80 | 3.08 |
| BFL/CT5 | 2.75 | 3.60 | 1.59 | 3.33 | 1.71 | 0.81 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
    a first lens having positive refractive power;
    a second lens having refractive power;
    a third lens having positive refractive power with a concave object-side surface and a convex image-side surface;
    a fourth lens having positive refractive power with a concave object-side surface and a convex image-side surface; and
    a fifth lens having refractive power,
    wherein Semi-FOV>48°, where Semi-FOV is half of a maximal field-of-view of the optical imaging lens assembly; and
    CT3/CT4>2.9, where CT3 is a center thickness of the third lens along the optical axis, and CT4 is a center thickness of the fourth lens along the optical axis.

2. The optical imaging lens assembly according to claim 1, wherein 1.0<TTL/ImgH<2.0,
    where TTL is a distance along the optical axis from an object-side surface of the first lens to an imaging plane of the optical imaging lens assembly, and ImgH is half of a diagonal length of an effective pixel area on the imaging plane of the optical imaging lens assembly.

3. The optical imaging lens assembly according to claim 1, wherein 1.0<f1/f3<2.0,
    where f1 is an effective focal length of the first lens, and f3 is an effective focal length of the third lens.

4. The optical imaging lens assembly according to claim 1, wherein 1.0<(R5+R6)/R2<3.0,
    where R5 is a radius of curvature of the object-side surface of the third lens, R6 is a radius of curvature of the image-side surface of the third lens, and R2 is a radius of curvature of an image-side surface of the first lens.

5. The optical imaging lens assembly according to claim 1, wherein 0.5<T12/(T23+T34)<1.5,
    where T12 is a spaced interval between the first lens and the second lens along the optical axis, T23 is a spaced interval between the second lens and the third lens along the optical axis, and T34 is a spaced interval between the third lens and the fourth lens along the optical axis.

6. The optical imaging lens assembly according to claim 1, wherein $1.0<DT21/DT11<2.5$,
where DT11 is a maximum effective radius of an object-side surface of the first lens, and DT21 is a maximum effective radius of an object-side surface of the second lens.

7. The optical imaging lens assembly according to claim 1, wherein $-2.5<DT32/SAG32<-1.5$,
where DT32 is a maximum effective radius of the image-side surface of the third lens, and SAG32 is an on-axis distance from an intersection of the image-side surface of the third lens and the optical axis to a vertex of an effective radius of the image-side surface of the third lens.

8. The optical imaging lens assembly according to claim 1, wherein $1.0<(|SAG41|+|SAG51|)/|SAG42|<3.5$,
where SAG41 is an on-axis distance from an intersection of the object-side surface of the fourth lens and the optical axis to a vertex of an effective radius of the object-side surface of the fourth lens, SAG42 is an on-axis distance from an intersection of the image-side surface of the fourth lens and the optical axis to a vertex of an effective radius of the image-side surface of the fourth lens, and SAG51 is an on-axis distance from an intersection of an object-side surface of the fifth lens and the optical axis to a vertex of an effective radius of the object-side surface of the fifth lens.

9. The optical imaging lens assembly according to claim 1, wherein $2.5<CT3/ET3<3.5$,
where CT3 is a center thickness of the third lens along the optical axis, and ET3 is an edge thickness of the third lens.

10. The optical imaging lens assembly according to claim 1, wherein $0.5<BFL/CT5<4.0$,
where BFL is a distance along the optical axis from an image-side surface of the fifth lens to an imaging plane, and CT5 is a center thickness of the fifth lens along the optical axis.

11. An optical imaging lens assembly, sequentially from an object side to an image side of the optical imaging lens assembly along an optical axis, comprising:
a first lens having positive refractive power;
a second lens having refractive power;
a third lens having positive refractive power with a concave object-side surface and a convex image-side surface;
a fourth lens having positive refractive power with a concave object-side surface and a convex image-side surface; and
a fifth lens having refractive power,
wherein $-1.5<(R7+R8)/f<-1.0$, where R7 is a radius of curvature of the object-side surface of the fourth lens, R8 is a radius of curvature of the image-side surface of the fourth lens, and f is a total effective focal length of the optical imaging lens assembly; and
$CT3/CT4>2.9$, where CT3 is a center thickness of the third lens along the optical axis, and CT4 is a center thickness of the fourth lens along the optical axis.

12. The optical imaging lens assembly according to claim 11, wherein $1.0<TTL/ImgH<2.0$,
where TTL is a distance along the optical axis from an object-side surface of the first lens to an imaging plane of the optical imaging lens assembly, and ImgH is half of a diagonal length of an effective pixel area on the imaging plane of the optical imaging lens assembly.

13. The optical imaging lens assembly according to claim 11, wherein $1.0<f1/f3<2.0$,
where f1 is an effective focal length of the first lens, and f3 is an effective focal length of the third lens.

14. The optical imaging lens assembly according to claim 11, wherein $1.0<(R5+R6)/R2<3.0$,
where R5 is a radius of curvature of the object-side surface of the third lens, R6 is a radius of curvature of the image-side surface of the third lens, and R2 is a radius of curvature of an image-side surface of the first lens.

15. The optical imaging lens assembly according to claim 11, wherein $0.5<T12/(T23+T34)<1.5$,
where T12 is a spaced interval between the first lens and the second lens along the optical axis, T23 is a spaced interval between the second lens and the third lens along the optical axis, and T34 is a spaced interval between the third lens and the fourth lens along the optical axis.

16. The optical imaging lens assembly according to claim 11, wherein $1.0<(|SAG41|+|SAG51|)/|SAG42|<3.5$,
where SAG41 is an on-axis distance from an intersection of the object-side surface of the fourth lens and the optical axis to a vertex of an effective radius of the object-side surface of the fourth lens, SAG42 is an on-axis distance from an intersection of the image-side surface of the fourth lens and the optical axis to a vertex of an effective radius of the image-side surface of the fourth lens, and SAG51 is an on-axis distance from an intersection of an object-side surface of the fifth lens and the optical axis to a vertex of an effective radius of the object-side surface of the fifth lens.

17. The optical imaging lens assembly according to claim 11, wherein $2.5<CT3/ET3<3.5$,
where CT3 is a center thickness of the third lens along the optical axis, and ET3 is an edge thickness of the third lens.

18. The optical imaging lens assembly according to claim 11, wherein $0.5<BFL/CT5<4.0$,
where BFL is a distance along the optical axis from an image-side surface of the fifth lens to an imaging plane, and CT5 is a center thickness of the fifth lens along the optical axis.

* * * * *